US008038160B2

(12) United States Patent
Seckel et al.

(10) Patent No.: US 8,038,160 B2
(45) Date of Patent: Oct. 18, 2011

(54) CASTER MOUNTING ARRANGEMENT FOR RIDE-ON TOY (75) Inventors: Timothy Seckel, Streamwood, IL (US); Charles Hartlaub, Glendale Heights, IL (US)

(73) Assignee: Radio Flyer Inc., Chicago, IL (US)

( * ) Notice: Subject to any disclaimer, the term of this patent is extended or adjusted under 35 U.S.C. 154(b) by 707 days.

(21) Appl. No.: 12/020,012

(22) Filed: Jan. 25, 2008

(65) Prior Publication Data

US 2009/0191788 A1    Jul. 30, 2009

(51) Int. Cl.
*A63H 17/26* (2006.01)

(52) U.S. Cl. .................. 280/47.41; 16/18 R; 446/465; 403/361

(58) Field of Classification Search .............. 280/47.41, 280/87.02, 647, 658; 446/465–469; 403/361; 16/18 R, 19, 45–46
See application file for complete search history.

(56) References Cited

U.S. PATENT DOCUMENTS

| 1,691,716 | A |   | 11/1928 | Herold |
|---|---|---|---|---|
| 3,161,907 | A |   | 12/1964 | Vincent |
| 3,768,116 | A | * | 10/1973 | Propst et al. ............... 16/43 |
| 4,327,929 | A | * | 5/1982 | Melzian ................. 280/282 |
| 4,351,084 | A |   | 9/1982 | Fontana |
| 4,361,930 | A | * | 12/1982 | Seesengood .............. 16/38 |
| 4,457,045 | A |   | 7/1984 | Kegg |
| 4,709,958 | A | * | 12/1987 | Harrod .................. 296/177 |
| 4,788,741 | A | * | 12/1988 | Hilborn .................. 16/35 R |
| 5,312,006 | A |   | 5/1994 | Lag |
| 5,421,794 | A |   | 6/1995 | Du |
| 5,745,951 | A |   | 5/1998 | Waner |
| 5,813,090 | A | * | 9/1998 | Miles .................... 16/37 |
| 6,212,733 | B1 | * | 4/2001 | Yeh .................... 16/35 R |
| 6,425,161 | B1 |   | 7/2002 | LeMeur et al. |
| 6,561,060 | B2 |   | 5/2003 | Nigrin |
| 6,588,059 | B1 | * | 7/2003 | McCord .................. 16/30 |
| 6,826,800 | B2 |   | 12/2004 | Kao |
| 6,871,863 | B2 | * | 3/2005 | Michelau .............. 280/87.01 |
| 7,165,751 | B2 |   | 1/2007 | De'Longhi |
| 7,216,878 | B2 | * | 5/2007 | Damon .............. 280/93.511 |
| 7,284,299 | B2 | * | 10/2007 | Ruckman et al. .......... 16/31 R |
| 2002/0132556 | A1 |   | 9/2002 | So |
| 2002/0144375 | A1 |   | 10/2002 | Drucker et al. |
| 2004/0068831 | A1 |   | 4/2004 | Caruso et al. |
| 2006/0200937 | A1 |   | 9/2006 | Ruckman et al. |

FOREIGN PATENT DOCUMENTS

JP          11247868          9/1999

* cited by examiner

*Primary Examiner* — J. Allen Shriver, II
*Assistant Examiner* — James Triggs
(74) *Attorney, Agent, or Firm* — R. Blake Johnston, Esq.; DLA Piper Piper US LLP (57) ABSTRACT A children's ride-on toy includes at least two casters. The ride-on toy has a first caster mount connected to the body, wherein the first caster mount comprises a first caster receptacle, and a second caster mount connected to the body, wherein the second caster mount comprises a second caster receptacle. In at least one embodiment, the first caster has an engagement shaft that is uniquely adapted to engage the first caster receptacle, and the second caster has an engagement shaft that is uniquely adapted to engage the second caster receptacle. In at least another embodiment, a first bushing rotatably engages the first caster and is uniquely adapted to engage the first caster receptacle, and a second bushing rotatably engages the second caster and is uniquely adapted to engage the second caster receptacle.

16 Claims, 12 Drawing Sheets

CASTER MOUNTING ARRANGEMENT FOR RIDE-ON TOY

BACKGROUND

The present invention relates generally to ride-on toys for children and, more specifically, to caster mounting arrangements for such toys.

Children's ride-on toys are available in a variety of configurations, including, but not limited to wagons, carts, tricycles, bicycles, scooters, cars, trucks and other toys. Ride-on toys generally have two or more wheels that support the toys on surfaces in a rolling fashion. Ride-on toys can be propelled in various ways, but are typically propelled either by an adult standing behind or beside the toy, or by a child sitting in or on the toy. One common manner of propelling a ride-on toy is via a child's foot power. Foot power can be supplied, for example, through the use of pedals, or by direct contact of feet on a surface such as pavement or grass ("foot-to-floor" toys). Ride-on toys also sometimes have a steering wheel or handle bars for the child to grip, some types of which are functional for steering the ride-on toy and some types of which are not.

Children's ride-on toys are often packaged and purchased in a partially assembled state. In such instances, a consumer, such as a parent or other adult, is expected to complete the assembly of the ride-on toy. In particular, in order to minimize the space occupied by a packaged ride-on toy, the wheels, as well as the various pieces to connect the wheels to the toy body, such as caster assemblies, are often left unattached. For such toys, the wheels, including any associated caster assemblies, must often be attached to the toy after purchase.

Caster assemblies for ride-on toys are often designed and intended to be mounted to a specific location on a ride-on toy, such as the right side or the left side. The function of a caster assembly can be impaired if a caster assembly is mounted in an incorrect manner. This can occur, for example, when a caster designed and intended to be mounted on the front right of a ride-on toy is instead mounted on the front left, or vice versa. The resulting impairment of the toy's function can be frustrating, as is the effort required to disassemble the toy and then reassemble it in the correct manner, if such disassembly is even possible. A need therefore exists for a caster mounting arrangement that discourages or prevents such incorrect assembly of the toy.

SUMMARY

Ride-on toys of the present invention have wheel mounting arrangements that include at least two casters.

In one aspect, embodiments of the present invention provide children's ride-on toy comprising a body, a first caster mount connected to the body, a second caster mount connected to the body, a first caster, a second caster, a first wheel rotatably mounted on the first caster, and a second wheel rotatably mounted on the second caster. In preferred embodiments, the first caster is uniquely adapted to engage the first caster mount and the second caster is uniquely adapted to engage the second caster mount. For example, it is preferred that the first caster mount comprises a first caster receptacle and the second caster mount comprises a second caster receptacle. It is also preferred that the first and second caster each comprise a caster stem, an engagement member, an engagement shaft, and a stopper. In some embodiments, the ride-on toy further comprises a first bushing that engages the first caster and a second bushing that engages the second caster. In at least some such embodiments, the first bushing is uniquely adapted to engage the first caster mount, and the second bushing is uniquely adapted to engage the second caster mount.

In another aspect, embodiments of the present invention provide a children's ride-on toy or a kit for a children's ride-on toy comprising a body, a first caster mount connected to the body, a second caster mount connected to the body, a first caster, a second caster, a first wheel, and a second wheel. Preferably, the first caster mount comprises a first caster receptacle and a first receiver, and the second caster mount comprises a second caster receptacle, a second receiver, and a boss. Additionally, it is preferred that the first caster comprises a caster stem, an engagement member, an engagement shaft, and a stopper, and that the second caster comprises a caster stem, an engagement member, an engagement shaft that is shorter than the first caster receptacle, and a stopper that is smaller in width than the first caster stopper.

In a third aspect, embodiments of the present invention provide a children's ride-on toy or a kit for a children's ride-on toy comprising a body, a first caster mount connected to the body, a second caster mount connected to the body, a first bushing comprising a first engagement member and a first engagement shaft, a second bushing comprising a second engagement member and a second engagement shaft, a first caster that rotatably engages the first bushing, a second caster that rotatably engages the second bushing, a first wheel that rotatably engages the first caster, and a second wheel that rotatably engages the second caster. In such embodiments, it is preferred that the first caster mount comprises a first receiver and a first caster receptacle having a first geometric shape, and that the second caster mount comprises a second receiver and a second caster receptacle having a second geometric shape.

The presently preferred embodiments can be further understood by reference to the following detailed description taken in conjunction with the accompanying drawings.

DETAILED DESCRIPTION OF EMBODIMENTS

Figure 1:
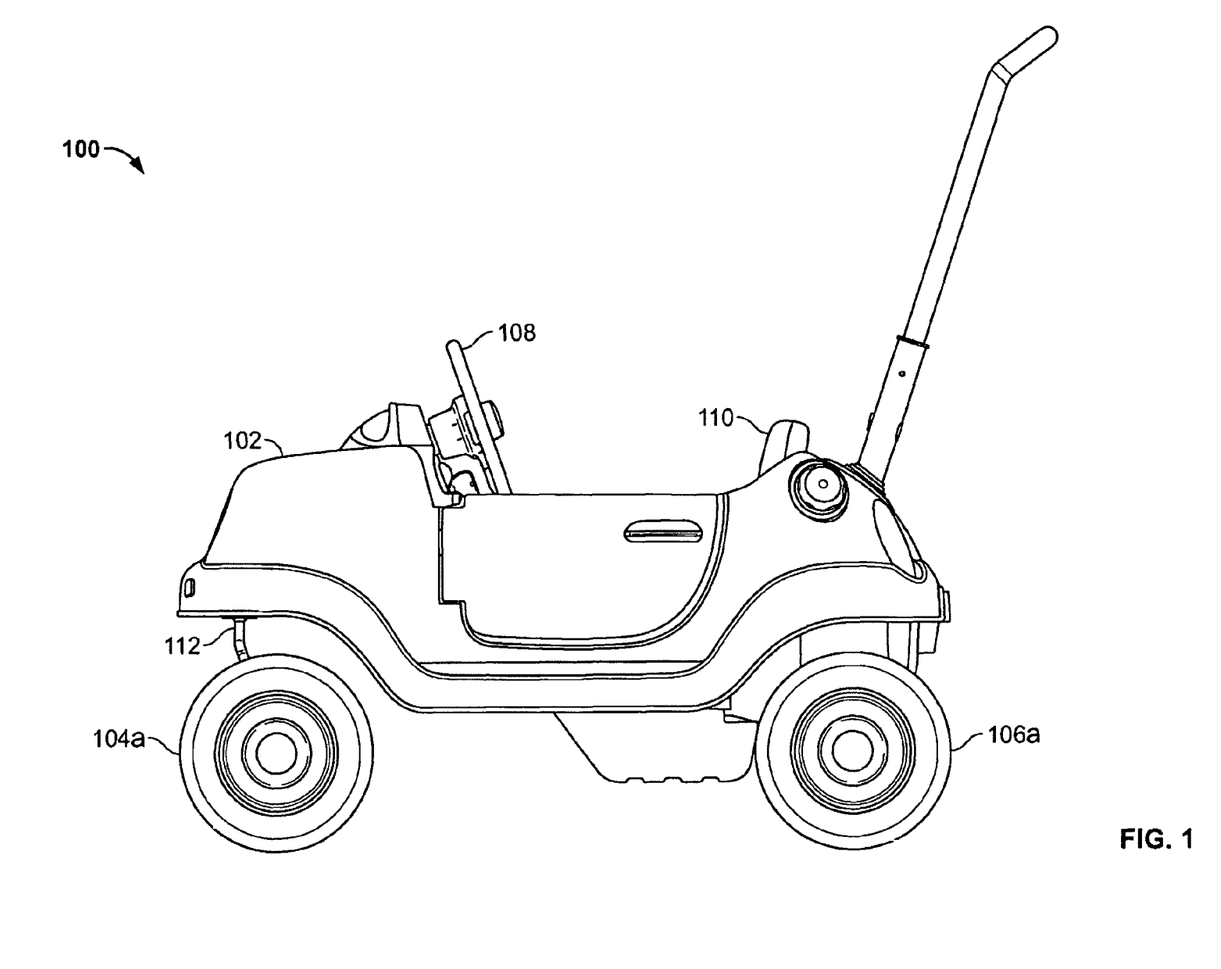
FIG. 1 is a side elevational view of an embodiment of the ride-on toy of the invention.
Figure 2:
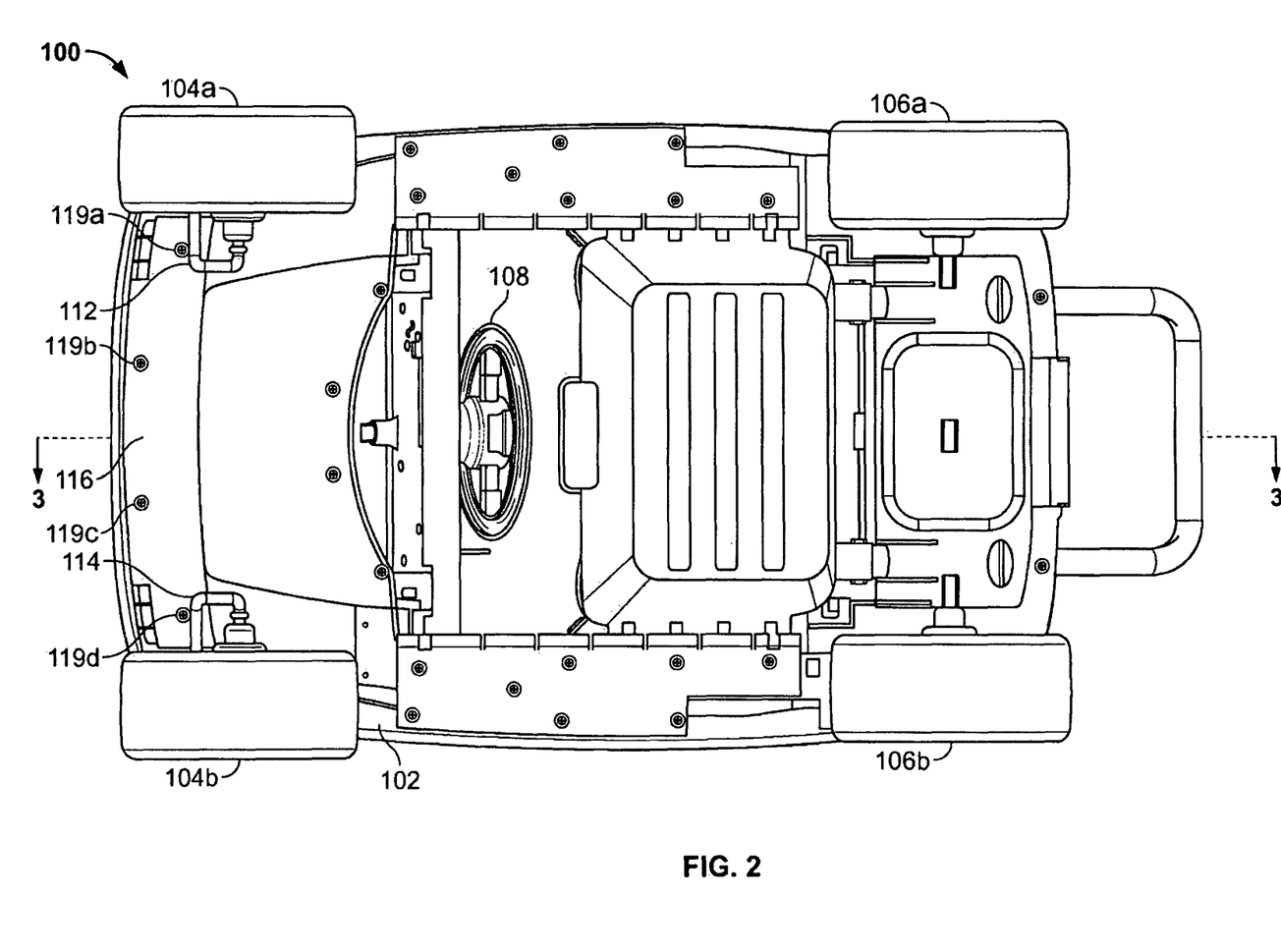
FIG. 2 is a bottom plan view the ride-on toy of FIG. 1.
Figure 3:
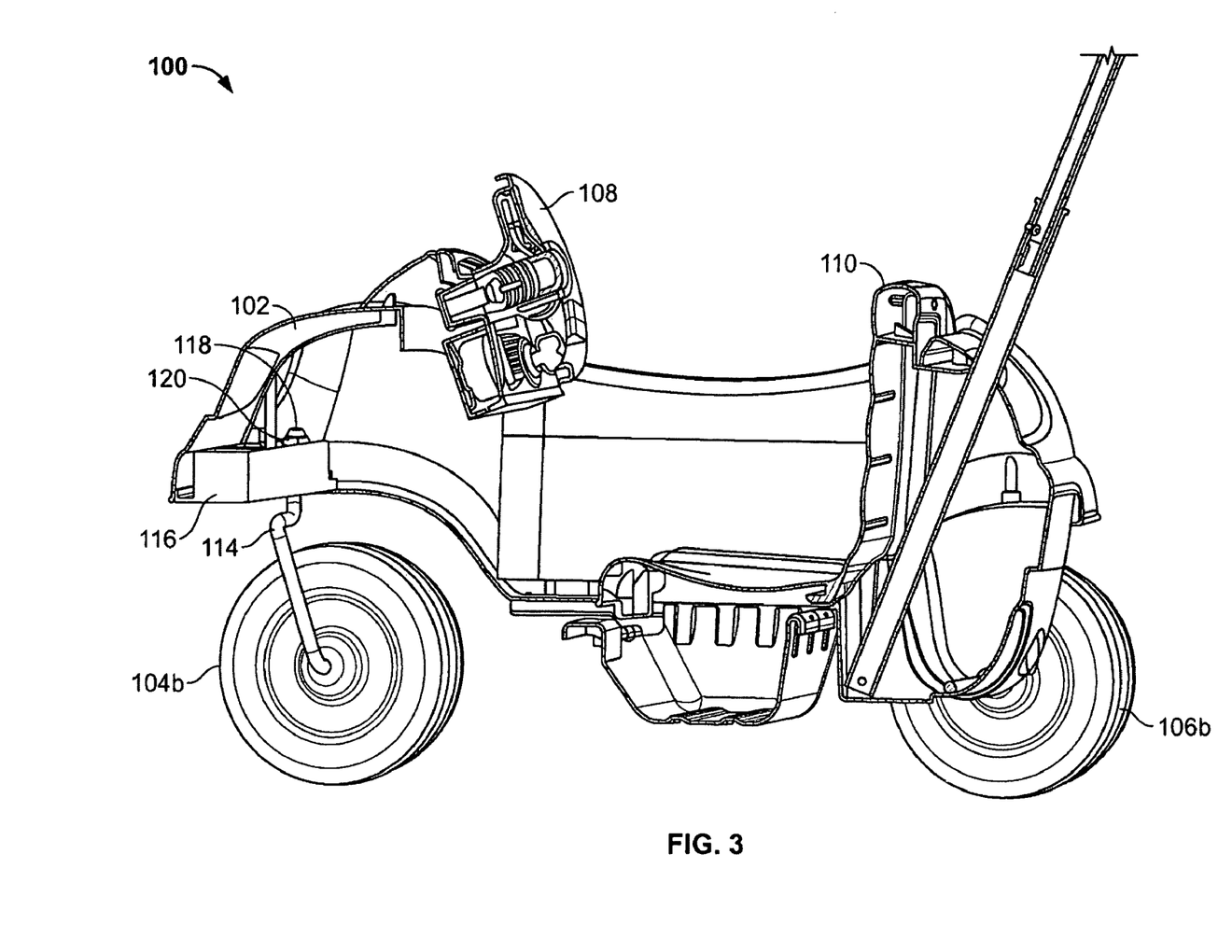
FIG. 3 is a cross sectional view of the ride-on toy of FIGS. 1-2, taken along line 3-3 of FIG. 2.

A preferred embodiment of the ride-on toy of the present invention is indicated in general at 100 in FIGS. 1 through. 3. As illustrated in FIGS. 1 through 3, the ride-on toy 100 features a body 102, a pair of front wheels 104a and 104b, and a pair of rear wheels 106a and 106b. The ride-on toy 100 also has a steering wheel 108 and a seat 110 upon which a child may sit. In this an embodiment, the steering wheel 108, while it may be gripped or turned by a child, is non-functional in that it is not connected to the front wheels 104a and 104b. Front wheel 104a, as illustrated in FIGS. 1-2, is rotatably mounted to caster 112. Front wheel 104b, as illustrated in FIGS. 2-3, is rotatably mounted to caster 114. Casters 112 and 114 are each rotatably engaged by bolster 116. Bolster 116 is connected to the body of the ride-on toy, as illustrated in FIGS. 2-3. Bolster 116 can be attached to the body by at least one fastener, such as snap fit pins 119a-119d of FIG. 2, or any other suitable fastener such as, for example, cotter pins, screws, or clips. Alternatively, bolster 116 can be integrally molded with the body.

Figure 4:
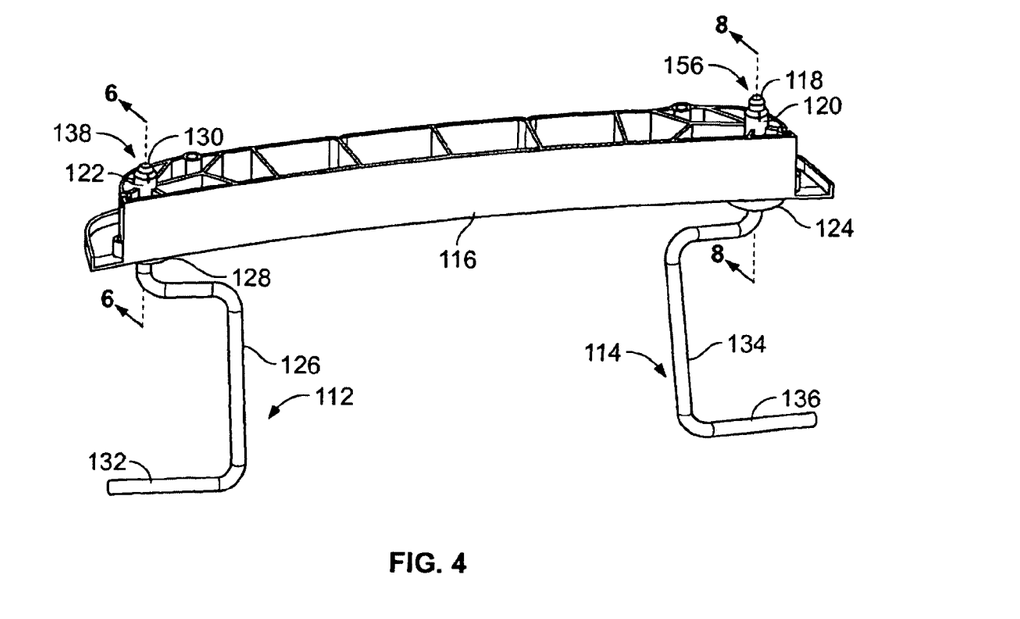
FIG. 4 is an enlarged perspective view of one embodiment of a bolster of the ride-on toy of FIGS. 1 through 3, with the casters correctly assembled thereto.
Figure 5:
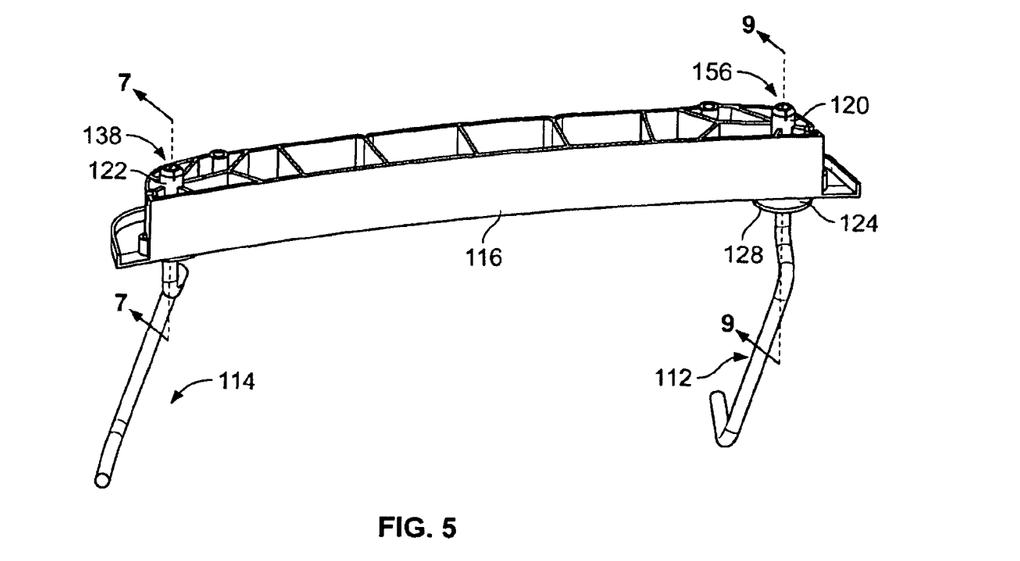
FIG. 5 is a perspective view of the bolster of FIG. 4, with the casters incorrectly positioned thereon.

FIGS. 4 and 5 illustrate bolster 116, which includes one embodiment of a first caster mount 138 and a second caster mount 156. As illustrated, the first and second caster mounts 138 and 156 are components of the bolster 116. In other embodiments the first and second caster mounts can be separately connected to the body of the ride-on toy, or can be integrally molded with the body of the ride-on toy.

As illustrated in FIGS. 4 and 5, first caster mount 138 has a first receiver 122 and a first caster receptacle (described below). Second caster mount 156 has a second receiver 120, a second caster receptacle (described below), and a boss 124. First caster 112 has a caster stem 126, a stopper 128, an engagement shaft (described below), an engagement member 130, and an axle 132. Second caster 114 has a caster stem 134, a stopper (described below), an engagement shaft (described below), an engagement member 118, and an axle 136.

As illustrated in FIG. 4, engagement member 130 of the first caster 112 engages the first receiver 122, and the engagement member 118 of the second caster 114 engages the second receiver 120. The engagement members preferably engage the receivers via a snap fit or press fit. However, the engagement members can engage the receivers in any other suitable manner, such as with hardware including, but not limited to, one or more cotter pins, e-clips, or set screws.

FIG. 4 illustrates casters 112 and 114 correctly assembled with, and engaged by, bolster 116. With respect to first caster 112, the engagement member 130 and the engagement shaft of the first caster can be inserted into, and are received by the first caster receptacle and the first receiver 122 of the bolster. Engagement member 130 of caster 112 engages receiver 122 in a rotating fashion, thus attaching caster 112 to bolster 116. Stopper 128 of the first caster 112 abuts bolster 116. With respect to second caster 114, engagement member 118 and the engagement shaft of the second caster can be inserted into, and are received by the boss 124, the second caster receptacle, and the second receiver 120 of the bolster. Engagement member 118 of caster 114 engages receiver 120 in a rotating fashion, thus attaching caster 114 to bolster 116. The boss 124 preferably has a receiving bore (described below) that receives the stopper of the second caster 114. The receiving bore preferably has a diameter larger than the second caster receptacle. As shown correctly assembled, casters 112 and 114 are properly oriented such that a first wheel can be rotatably mounted on the first caster 112 at axle 132, and a second wheel can be rotatably mounted on the second caster 114 at axle 136.

FIG. 5 illustrates casters 112 and 114 incorrectly positioned on, and not engaged by, bolster 116. As illustrated, the engagement shaft of the second caster 114 is shorter in length than the first caster receptacle. Thus, when the engagement shaft and engagement member of caster 114 are inserted into the first caster receptacle, the engagement member of caster 114 is not received or engaged by receiver 122. Additionally, the stopper 128 of the first caster 112 has a width larger than the diameter of the receiving bore of boss 124. First caster stopper 128 is thus not received by the receiving bore in boss 124, and the first caster engagement member 130 is not received or engaged by the second receiver 120.

FIGS. 4 and 5 thus illustrate that the first caster 112 is uniquely adapted to engage the first caster mount 138, and the second caster 114 is uniquely adapted to engage the second cater mount 156. For example, engagement member 130 of the first caster 112 can engage the first receiver 122, but does not engage the second receiver 120. Similarly, the engagement member 118 of the second caster 114 engages the second receiver 120, but does not engage the first receiver 122. In this manner, an adult attempting to assemble the casters with the ride-on toy will only be able to complete the assembly in the correct configuration. An attempt to complete the assembly in the incorrect configuration would be evident because the casters would not engage the bolster.

FIGS. 6 through 9 are cross sectional views of the first and second caster mounts 138 and 156 of bolster 116, which further illustrate the how the casters are mounted to the bolster in the illustrated preferred embodiment.

Figure 6:
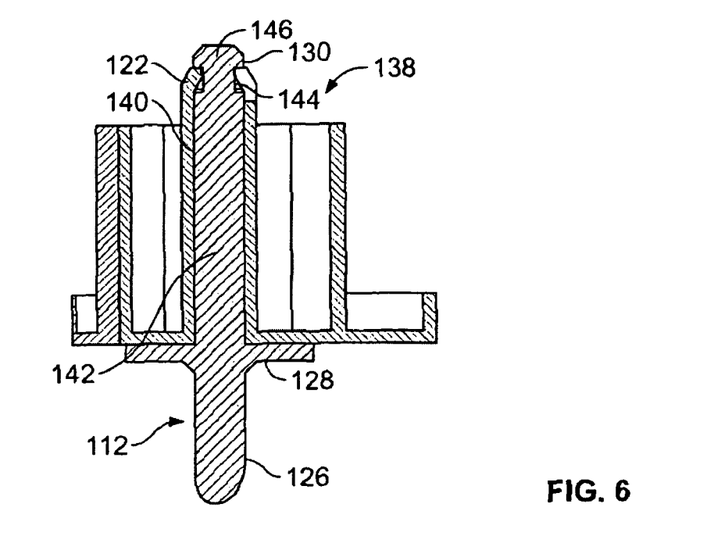
FIG. 6 is a cross sectional view the first caster and the first caster mount of FIG. 4, taken along line 6-6 of FIG. 4.
Figure 7:
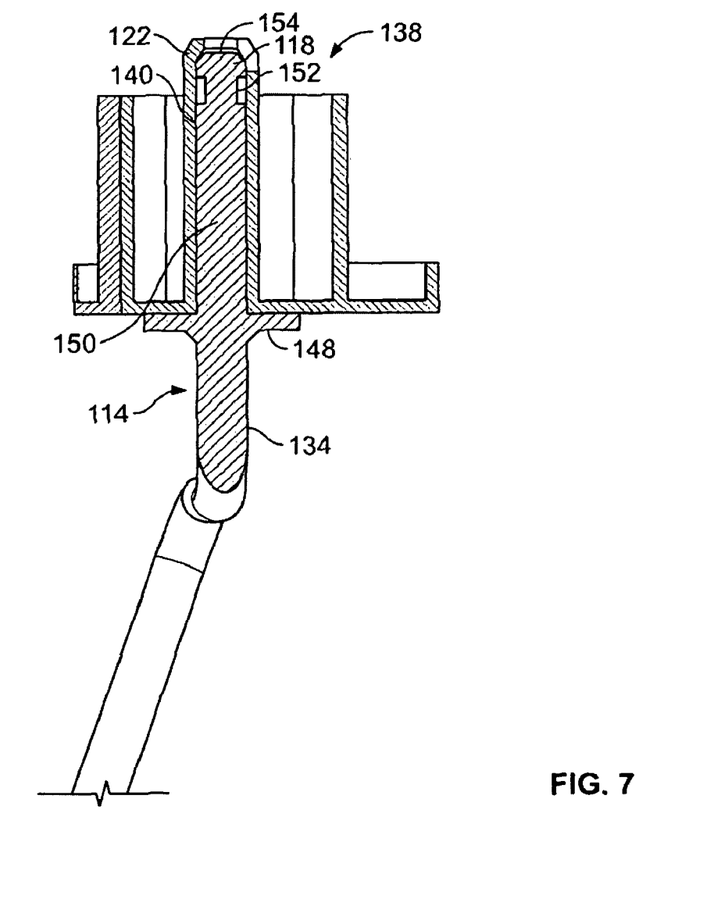
FIG. 7 is a cross sectional view of the second caster and the first caster mount of FIG. 5, taken along line 7-7 of FIG. 5.

FIG. 6 is a cross sectional view the first caster and the first caster mount 138 of FIG. 4, taken along line 6-6 of FIG. 4. As illustrated in FIG. 6, the first caster 112 is correctly assembled with the first caster mount 138. FIG. 7 is a cross sectional view of the second caster 114 and the first caster mount 138 of FIG. 5, taken along line 7-7 of FIG. 5. As illustrated, the second caster 114 is incorrectly assembled with the first caster mount 138.

As illustrated in FIG. 6, first caster mount 138 has a caster receptacle 140 and a receiver 122. First caster 112 has a caster stem 126, an engagement member 130, an engagement shaft 142, and a stopper 128. First caster 112 has been inserted into first caster mount 138, and the engagement member 130 of the first caster 112 is received by and engaged by the receiver 122 of the first caster mount 138. In this embodiment, engagement member 130 has indented engagement portion 144 and engagement head 146, which rotatably engage receiver 122 via a snap fit. Engagement shaft 142 of caster 112 is received by first caster receptacle 140, and can rotate therein. Stopper 128 of caster 112 abuts first caster mount 138, and prevents caster 112 from being further inserted into first caster mount 138 once appropriate engagement has been achieved.

FIG. 7 also illustrates first caster mount 138 with a caster receptacle 140 and a receiver 122. As described previously, the second caster 114 has a caster stem 134, an engagement member 118, an engagement shaft 150 that is shorter than the engagement shaft 142 of the first caster 112, and a stopper 148 that is smaller in width than the stopper 128 of the first caster 112. Second caster engagement member 118 has indented engagement portion 152 and engagement head 154. As shown in FIG. 7, the engagement shaft 150 of the second caster 114 is shorter in length than the caster receptacle 140 of the first caster mount 138. As a result of the second caster engagement shaft 150 being shorter than the first caster receptacle 140, the second caster engagement member 118 is not received by the first receiver 122.

Figure 8:
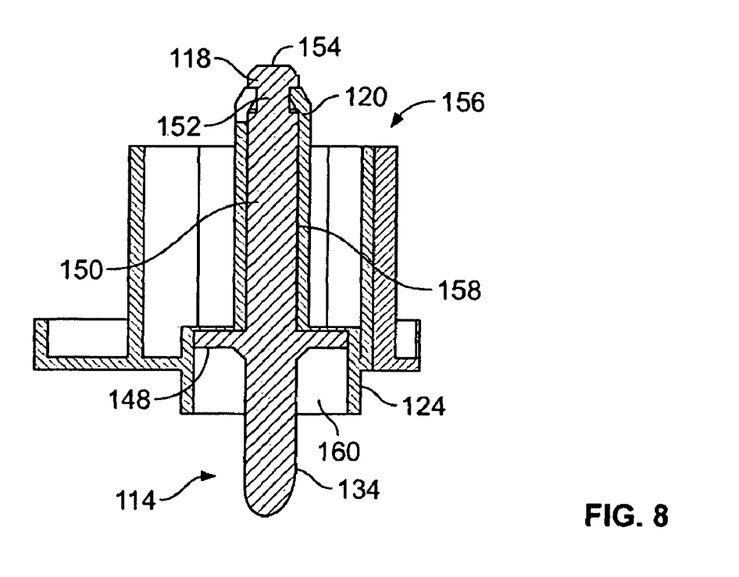
FIG. 8 is a cross sectional view of the second caster and the second caster mount of FIG. 4, taken along line 8-8 of FIG. 4.
Figure 9:
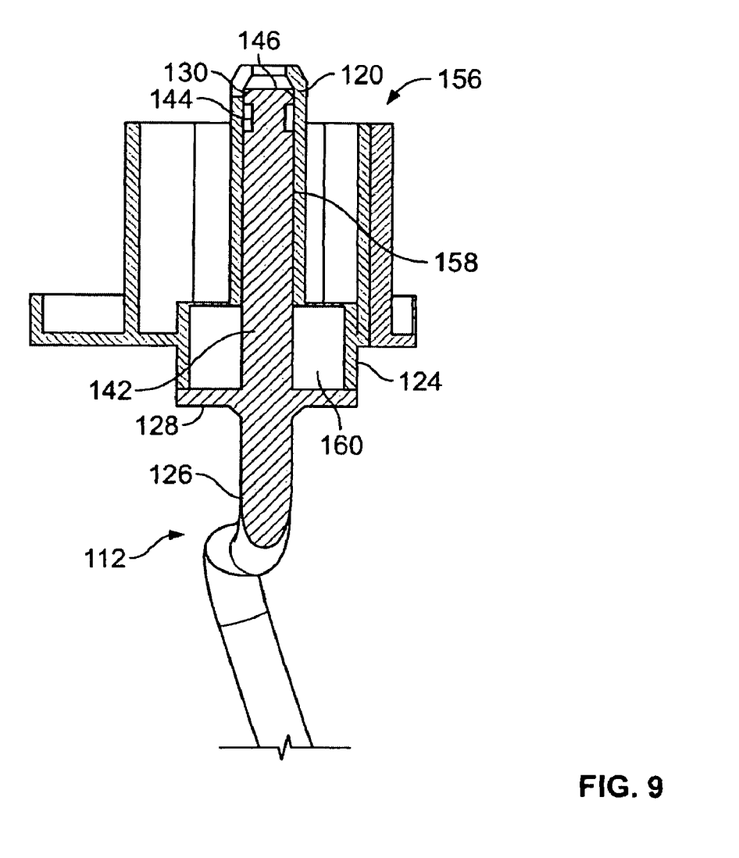
FIG. 9 is a cross sectional view of the first caster and the second caster mount of FIG. 5, taken along line 9-9 of FIG. 5.

FIG. 8 is a cross sectional view of the second caster 114 and the second caster mount 156 of FIG. 4, taken along line 8-8 of FIG. 4. As illustrated in FIG. 8, the second caster 114 is correctly assembled with the second caster mount 156. FIG. 9 is a cross sectional view of the first caster 112 and the second caster mount 156 of FIG. 5, taken along line 9-9 of FIG. 5. As illustrated, the first caster 112 is incorrectly assembled with the second caster mount 156.

As illustrated in FIG. 8 and described previously, second caster mount 156 has boss 124, second caster receptacle 158, and second receiver 120. Second caster 114 has a caster stem 134, an engagement member 118, an engagement shaft 150, and a stopper 148. Engagement member 118 comprises engagement head 154 and indented engagement portion 152. Engagement member 118 of the second caster 114 engages, preferably rotatably, the receiver 120 of the second caster mount 156. Boss 124 of the second caster mount 156 has a receiving bore 160, and the stopper 148 of the second caster 114 is received by the receiving bore 160. The receiving bore 160 of boss 124 preferably has a diameter larger than the caster receptacle 158 of the second caster mount 156.

FIG. 9 also illustrates second caster mount 156 having boss 124 with receiving bore 160, second caster receptacle 158, and second receiver 120. As described previously, the first caster 112 has a caster stem 126, an engagement member 130, an engagement shaft 142, and a stopper 128 that is larger in width than the stopper 148 of the second caster 114. Engagement member 130 has indented engagement portion 144 and engagement head 146. As shown in FIG. 9, the stopper 128 of the first caster 112 has a width that is larger than the diameter of the receiving bore 160 of the second caster mount 156. As a result, the first caster stopper 128 is not received by a receiving bore 160 in the boss 124, and the first caster engagement member 130 is not received by the second receiver 120.

Figure 10:
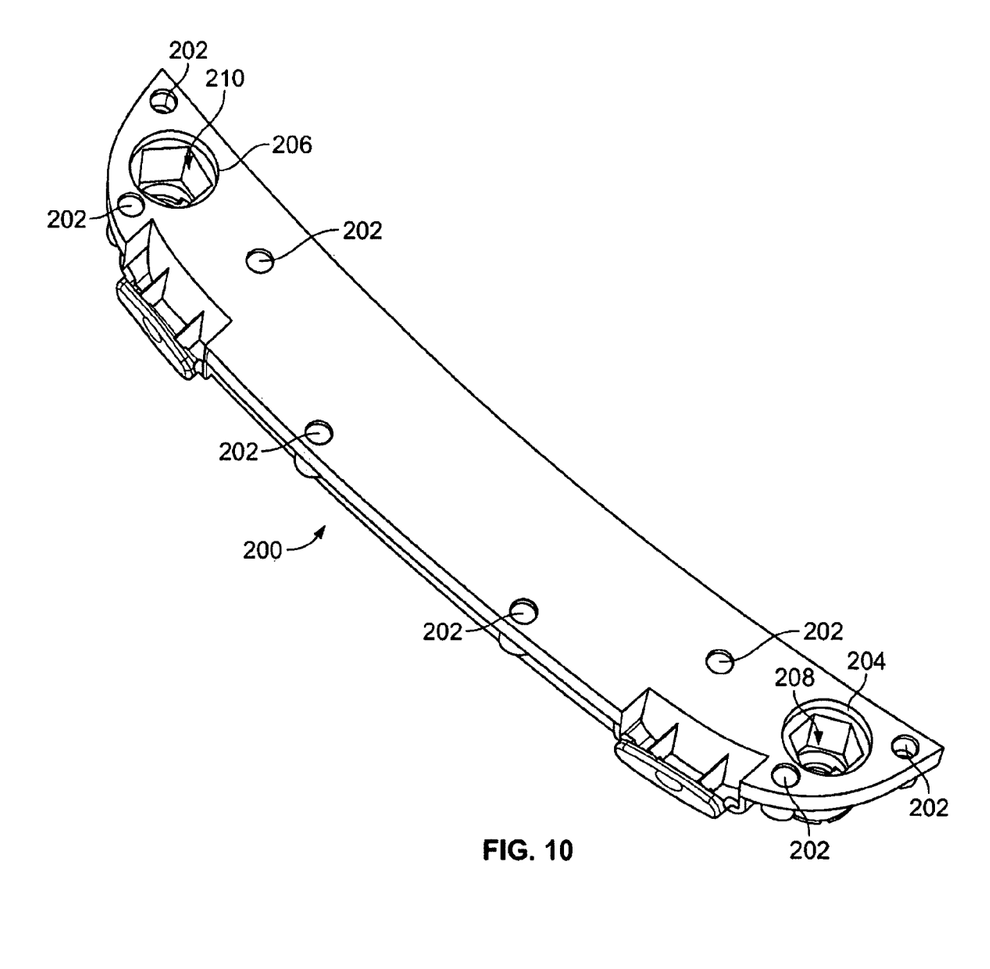
FIG. 10 is an enlarged bottom perspective view of a second embodiment of a bolster of the ride-on toy of the present invention.

FIG. 10 illustrates bolster 200, which is another embodiment of a bolster that can be connected to the body of a ride-on toy in the present invention, such as the ride-on toy illustrated in FIGS. 1-3. As illustrated, bolster 200 has at least one connection bore 202 that allows for the bolster 200 to be attached to the body of a ride-on toy by at least one fastener, such as, for example, snap fit pins, cotter pins, screws, clips, or any other suitable fastener. Alternatively, bolster 200 can be integrally molded with the body. Bolster 200 includes embodiments of a first caster mount 204 and a second caster mount 206. As illustrated the first and second caster mounts 204 and 206 are components of the bolster 200. In other embodiments, the first and second caster mounts 204 and 206 can be separately connected to the body of the ride-on toy, or can be integrally molded with the body of the ride-on toy.

As illustrated in FIG. 10 first caster mount 204 has a first caster receptacle 208, and second caster mount 206 has a second caster receptacle 210. The first caster receptacle 208 has a first geometric shape, and the second caster receptacle 210 has a second geometric shape. The geometric shape of each caster receptacle can be determined from the shape of the cross section of the caster receptacle. As illustrated in FIG. 10, the second geometric shape of the second caster receptacle 210 is different than the first geometric shape of the first caster receptacle 208. Specifically, first caster receptacle 208 has a geometric shape that is a hexagon, and second caster receptacle 210 has a geometric shape that is a pentagon. Caster receptacles can have any suitable geometric shape, including a circle, a triangle, a square, a trapezoid, a rectangle, a star, a pentagon, a hexagon, a heptagon, an octagon, an n-gon, or an irregular shape. It is preferred that the first geometric shape of the first caster receptacle 208 and the second geometric shape of the second caster receptacle 210 be selected such that each of the corresponding bushings, discussed below, will only engage one of the caster receptacles, and will not fit within the other caster receptacle, even if misaligned.

Figure 11:
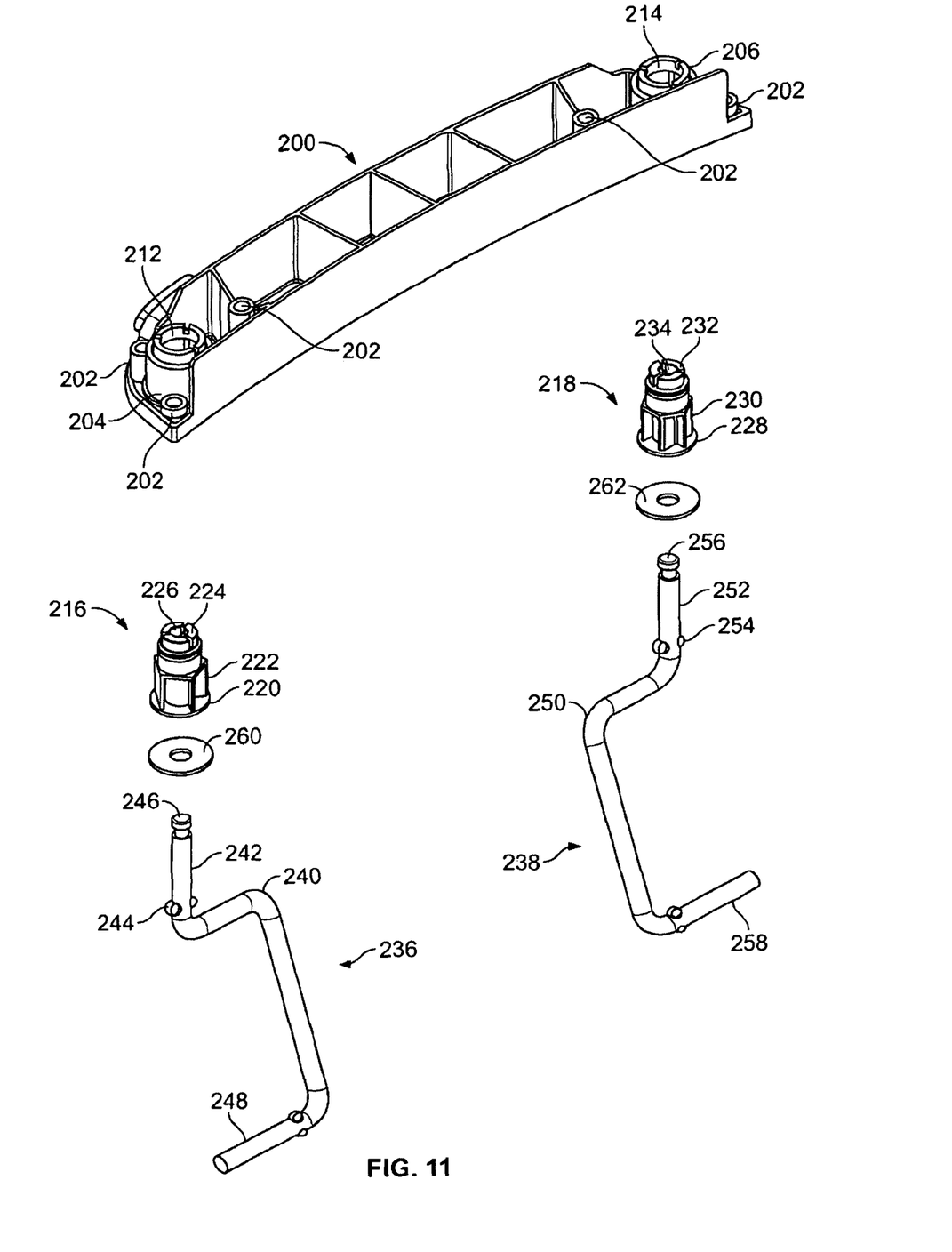
FIG. 11 is an exploded top perspective view of the bolster of FIG. 10 and embodiments of caster assembly components.
Figure 12:
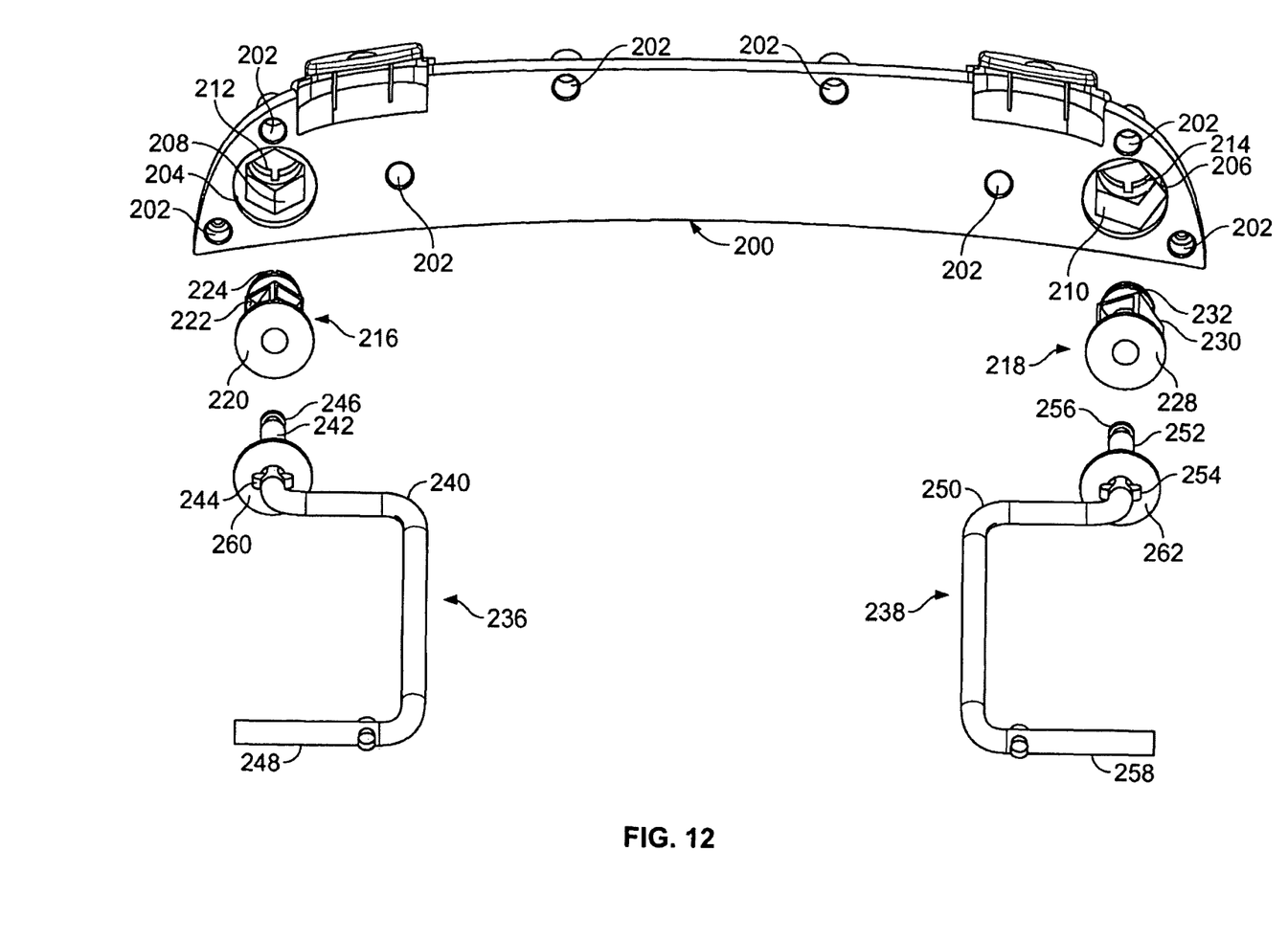
FIG. 12 is an exploded bottom perspective view of the bolster and caster assembly components of FIG. 11.
Figure 13:
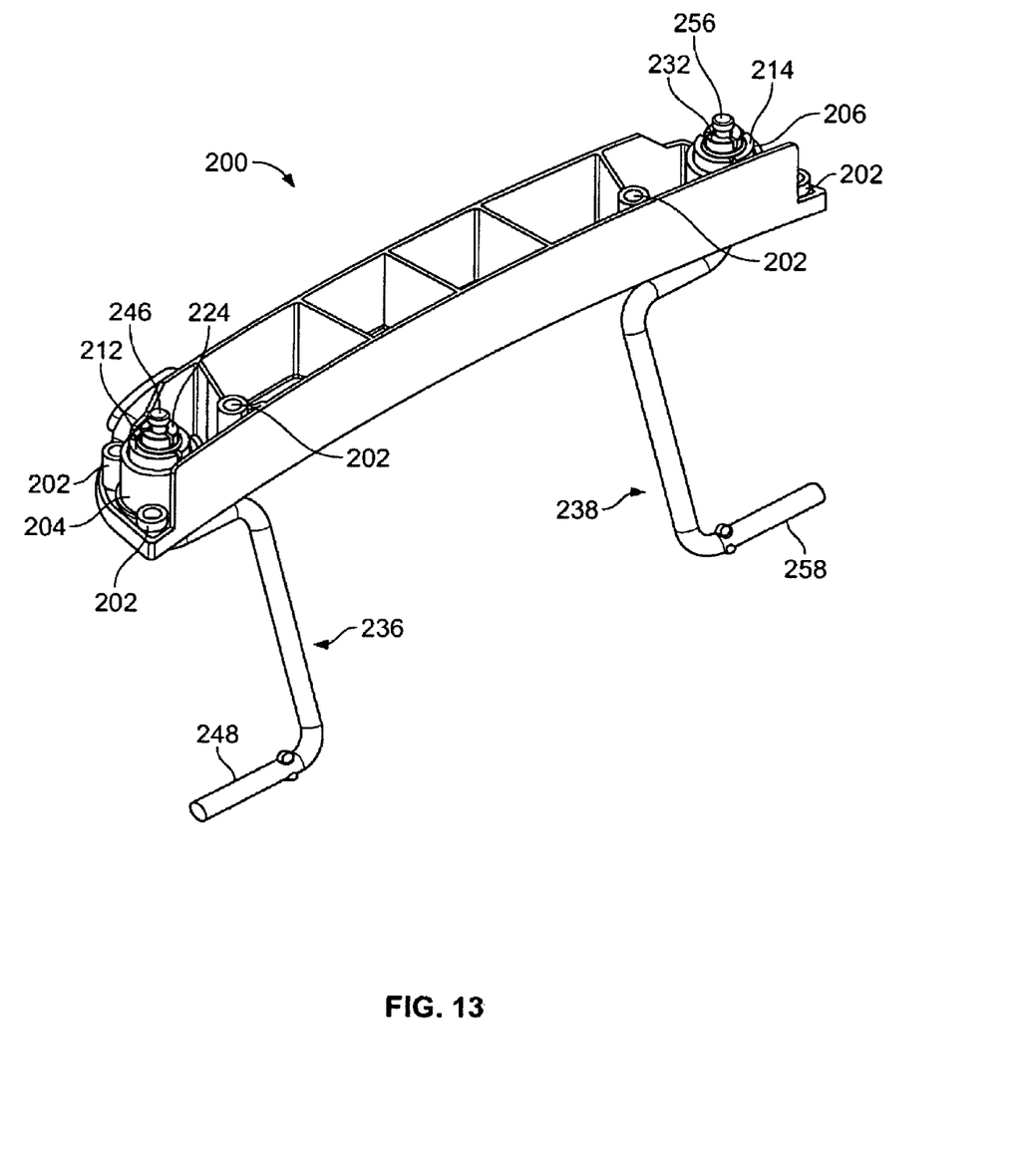
FIG. 13 is an assembled top perspective view of FIGS. 11-12.

FIGS. 11 through 13 illustrate the assembly of casters 236 and 238 with bolster 200. FIGS. 11 and 12 are exploded views, illustrating the separate components in alignment for assembly. FIG. 13 illustrates the components as assembled. First caster mount 204 has, in addition to a first caster receptacle 208, a first receiver 212. Second caster mount 206 has, in addition to a second caster receptacle 210, a second caster receiver 214.

As illustrated in FIGS. 11 through 13, first caster 236 has a caster stem 240, a stopper 244, an engagement shaft 242, an engagement member 246, and an axle 248. Second caster 238 has a caster stem 250, a stopper 254, an engagement shaft 252, an engagement member 256, and an axle 258. In the embodiment illustrated in FIGS. 11 through 13, first bushing 216 is assembled with first washer 260 and first caster 236, and second bushing 218 is assembled with second washer 262 and second caster 238. In preferred embodiments, casters are assembled with their respective bushings, as well as with any other components, such as, for example, the washers illustrated in FIGS. 11 through 13, at the factory, so that a consumer need only attach the pre-assembled caster assemblies to the caster mounts on the body of the ride-on toy.

First bushing 216 receives and rotatably engages the first caster 236, and is received and engaged by the first caster mount 204. First bushing 216 has first bottom portion 220, first engagement portion 222, first top portion 224, and first through bore 226. As illustrated in FIGS. 11 and 12, first bushing 216 can be assembled with first caster 236 and washer 260, by sliding washer 260 over the engagement shaft 242 of first caster 236 so that it directly abuts stopper 244, and then attaching bushing 216 by sliding it over engagement shaft 242 of the first caster 236 so that bottom portion 220 directly abuts washer 260, through bore 226 receives engagement shaft 242, and top portion 224 receives and engages the engagement member 246 of the first caster 236. Top portion 224 of first bushing 216 preferably engages engagement member 246 of the first caster 236 by a snap fit or press fit, although any suitable method of engagement can be utilized, such as, for example, with hardware including, but not limited to, one or more cotter pins, e-clips, or set screws.

Additionally, first bushing 216 can be assembled with first caster mount by sliding the first bushing 216 into caster receptacle 208 so that top portion 224 of first bushing 216 is received and engaged by receiver 212 of the first caster mount 204, and the engagement portion 222 of the first bushing 216 is received by first caster receptacle 208 of the first caster mount 204. Top portion 224 of first bushing 216 preferably engages receiver 212 of the first caster mount 204 by a snap fit or press fit, although any suitable method of engagement can be utilized, such as, for example, with hardware including, but not limited to, one or more cotter pins, e-clips, or set screws.

Likewise, second bushing 218 receives and rotatably engages the second caster 238, and is received and engaged by the second caster mount 206. Second bushing 218 has second bottom portion 228, second engagement portion 230, second top portion 232, and second through bore 234. As illustrated in FIGS. 11 and 12, second bushing 218 can be assembled with second caster 238 and washer 262, by sliding washer 262 over the engagement shaft 252 of second caster 238 so that it directly abuts stopper 254, and then attaching bushing 218 by sliding it over engagement shaft 252 of the second caster 238 so that bottom portion 228 directly abuts washer 262, through bore 234 receives engagement shaft 252, and top portion 232 receives and engages the engagement member 256 of the second caster 238. Top portion 232 of second bushing 218 preferably engages engagement member 256 of the second caster 238 by a snap fit or press fit, although any suitable method of engagement can be utilized, such as, for example, with hardware including, but not limited to, one or more cotter pins, e-clips, or set screws.

Further, second bushing 218 can be assembled with second caster mount 206 by sliding the second bushing 218 into caster receptacle 210 so that top portion 232 of second bushing 218 is received and engaged by receiver 214 of the second caster mount 206, and the engagement portion 230 of the second bushing 218 is received by second caster receptacle 210 of the second caster mount 206. Top portion 232 of second bushing 218 preferably engages receiver 214 of the second caster mount 206 by a snap fit or press fit, although any suitable method of engagement can be utilized, such as, for example, with hardware including, but not limited to, one or more cotter pins, e-clips, or set screws.

FIGS. 14-17 further illustrate first bushing 216 and second bushing 218.

Figure 14:
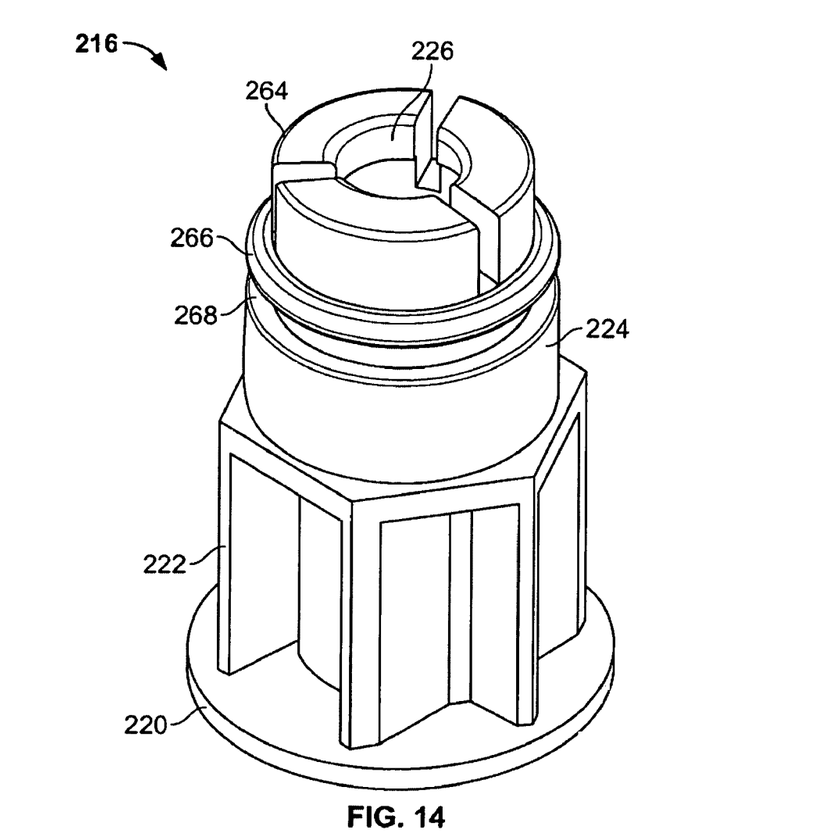
FIG. 14 is an enlarged perspective view of a first bushing of FIG. 11.
Figure 15:
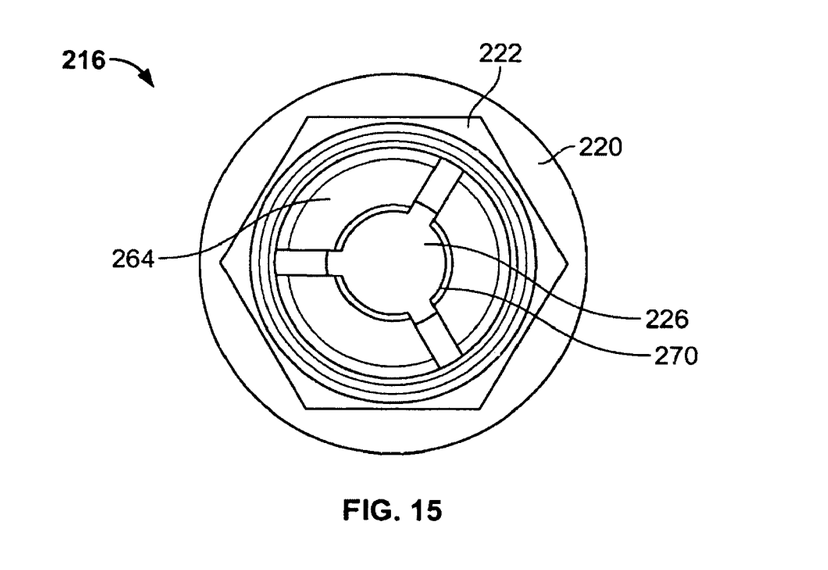
FIG. 15 is an enlarged top plan view of the first bushing of FIG. 14.

As illustrated in FIGS. 14 and 15, first bushing 216 has first bottom portion 220, first engagement portion 222, first top portion 224, and first through bore 226. Features to facilitate the engagement of top portion 224 with first receiver 212 of first caster mount 204 are located on the outside of top portion 224. The features shown in FIGS. 14 and 15 include ridge 266 and indented portion 268. When bushing 216 is attached or secured within receiver 212 of first caster mount 204, the receiver 212 engages at least indented portion 268, and ridge 266 prevents bushing 216 from pulling out of receiver 212. Top portion 224 of first bushing 216 also includes caster receiver 264. When first caster 236 is received by first bushing 216, engagement member 246 of the first caster 236 slides through the first bushing through bore 226 and is engaged by caster receiver 264.

Figure 16:
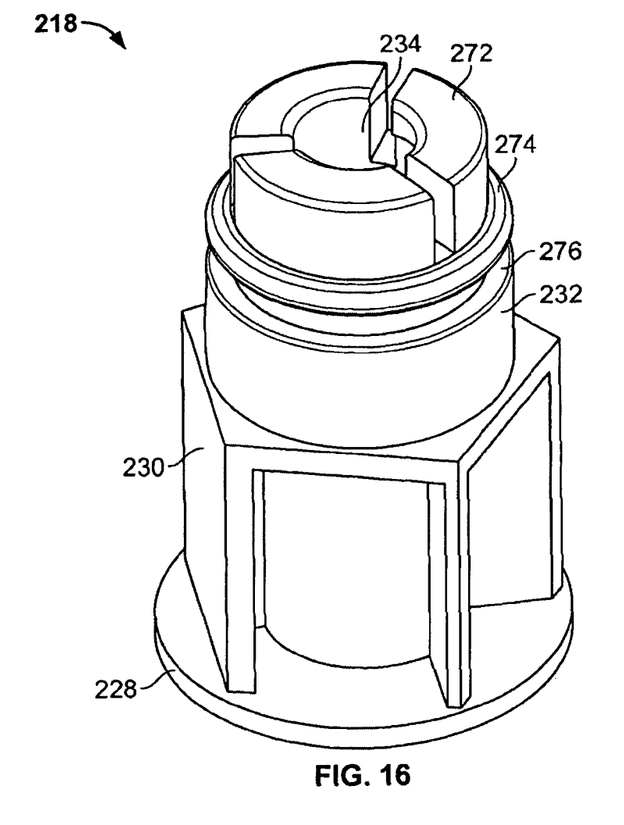
FIG. 16 is an enlarged perspective view of a second bushing of FIG. 11.
Figure 17:
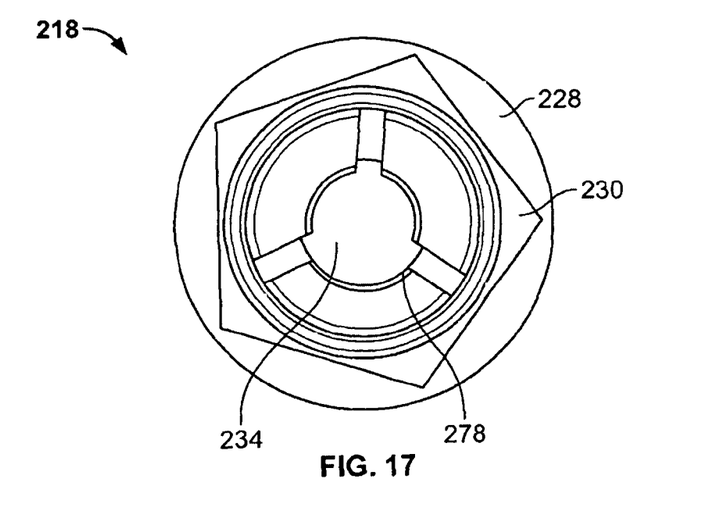
FIG. 17 is an enlarged top plan view of the second bushing of FIG. 16.

As illustrated in FIGS. 16 and 17, second bushing 218 has second bottom portion 228, second engagement portion 230, second top portion 232, and second through bore 234. Features to facilitate the engagement of top portion 232 with second receiver 214 of second caster mount 206 are located on the outside of top portion 232. The features shown in FIGS. 16 and 17 include ridge 274 and indented portion 276. When second bushing 218 is attached or secured within second receiver 214 of second caster mount 206, the receiver 214 engages at least indented portion 276, and ridge 274 prevents bushing 218 from pulling out of receiver 214. Top portion 232 of second bushing 218 also includes caster receiver 272. When second caster 238 is received by second bushing 218, engagement member 256 of the second caster 238 slides through the second bushing through bore 234 and is engaged by caster receiver 272.

In preferred embodiments, first bushing 216 is uniquely adapted to engage the first caster receptacle 204, and the second bushing 218 is uniquely adapted to engage the second caster receptacle 206. For example, the first engagement portion 222 of first bushing 216 and the second engagement portion 230 of the second bushing 218 preferably each have a cross section having a geometric shape. Bushings can have any geometric shape that corresponds to the geometric shape of a caster mount receptacle, such as, for example, a circle, a triangle, a square, a trapezoid, a rectangle, a star, a pentagon, a hexagon, a heptagon, an octagon, an n-gon, or an irregular shape. It is preferred that the geometric shape of the first engagement portion 222 of the first bushing 216 be different than the geometric shape of the second engagement portion of the second bushing. Most preferably, the geometric shapes of each caster receptacle and the engagement portions of each bushing are selected such that each engagement portion of a bushing will only engage its corresponding caster receptacle, and will not fit within the other caster receptacle, even if misaligned.

As illustrated in FIGS. 14-17, the geometric shape of the first engagement portion 222 of first bushing 216 is a hexagon, and the geometric shape of the second engagement portion 230 of the second bushing 218 is a pentagon. The geometric shapes of the first and second engagement portions 222 and 230 correspond, respectively, to the geometric shapes of the first caster receptacle 208 and the second caster receptacle 210, as illustrated in FIGS. 10-13. In this manner the first engagement portion 222 is received by first caster mount receptacle 208, but is not received by second caster receptacle 210. Likewise second engagement portion 230 is received by second caster receptacle 210, but is not received by first caster receptacle 208.

From the foregoing, it will be appreciated that although specific embodiments of the invention have been described herein for purposes of illustration, various modifications may be made without deviating from the spirit or scope of the invention. It is therefore intended that the foregoing detailed description be regarded as illustrative rather than limiting, and that it be understood that it is the following claims, including all equivalents, that are intended to particularly point out and distinctly claim the subject matter regarded as the invention.

What is claimed is:

1. A children's ride-on toy comprising:
   a) a body;
   b) a first caster mount connected to the body, wherein the first caster mount comprises a first caster mount receptacle;
   c) a second caster mount connected to the body, wherein the second caster mount comprises a second caster mount receptacle;
   d) a first caster uniquely configured to support the body at a first location on the body and adapted to engage the first caster mount receptacle but not the second caster mount receptacle, the first caster comprising a caster stem, an engagement member, an engagement shaft, and a stopper;
   e) a second caster uniquely configured to support the body at a second location on the body and adapted to engage the second caster mount receptacle but not the first caster mount receptacle, the second caster comprising a caster stem, an engagement member, an engagement shaft, and a stopper;
   f) said first and second locations on the body differing from one another; and
   g) a first wheel rotatably mounted on the first caster and a second wheel rotatably mounted on the second caster.

2. The ride-on toy of claim 1, wherein the first caster mount further comprises a first receiver, and wherein the second caster mount further comprises a second receiver and a boss.

3. The ride-on toy of claim 2, wherein the engagement member of the first caster engages the first receiver, and the engagement member of the second caster engages the second receiver.

4. The ride-on toy of claim 3, wherein the engagement member of the first caster engages the first receiver via a snap fit or press fit, and the engagement member of the second caster engages the second receiver via a snap fit or press fit.

5. The ride-on toy of claim 2, wherein the boss comprises a receiving bore having a diameter larger than the second caster receptacle, and wherein the stopper of the second caster is received by the receiving bore.

6. The ride-on toy of claim 2, wherein the boss comprises a receiving bore having a diameter larger than the second caster receptacle, and wherein the stopper of the first caster has a width larger than the diameter of the receiving bore.

7. The ride-on toy of claim 1, wherein the engagement shaft of the second caster is shorter in length than the first caster receptacle.

8. The ride-on toy of claim 1, wherein the engagement shaft of the second caster is shorter than the engagement shaft of the first caster, and wherein the stopper of the second caster is smaller in width than the stopper of the first caster.

9. The ride-on toy of claim 1, further comprising a bolster connected to the body, wherein the bolster comprises the first caster mount and the second caster mount.

10. The ride-on toy of claim 1, wherein the first caster mount receptacle has a first geometric shape, and wherein the second caster mount receptacle has a second geometric shape.

11. The ride-on toy of claim 10, wherein the second geometric shape of the second caster mount receptacle is different than the first geometric shape of the first caster mount receptacle, and wherein the second geometric shape of the second caster mount receptacle is a circle, a triangle, a square, a trapezoid, a rectangle, a star, a pentagon, a hexagon, a heptagon, an octagon, an n-gon, or an irregular shape.

12. The ride-on toy of claim 11, further comprising:
a first bushing comprising a first top portion and a first engagement portion; and
a second bushing comprising a second top portion member and a second engagement portion;
wherein the first bushing rotatably engages the first caster and is received by the first caster mount, and the second bushing rotatably engages the second caster and is received by the second caster mount.

13. The ride-on toy of claim 12, wherein the first geometric shape of the first caster mount receptacle is a circle, a triangle, a square, a trapezoid, a rectangle, a star, a pentagon, a hexagon, a heptagon, an octagon, an n-gon, or an irregular shape.

14. The ride-on toy of claim 13, wherein the second geometric shape of the second caster mount receptacle is different than the first geometric shape of the first caster mount receptacle, and wherein the second geometric shape of the second caster mount receptacle is a circle, a triangle, a square, a trapezoid, a rectangle, a star, a pentagon, a hexagon, a heptagon, an octagon, an n-gon, or an irregular shape.

15. A kit for a children's ride-on toy comprising:
a) a body;
b) a first caster mount connected to the body, the first caster mount comprising a first receiver and a first caster mount receptacle having a first geometric shape;
c) a second caster mount connected to the body, the second caster mount comprising a second receiver and a second caster mount receptacle having a second geometric shape that differs from the first geometric shape;
d) a first bushing uniquely adapted to engage the first caster mount, the first bushing comprising a first top portion and a first engagement portion;
e) a second bushing uniquely adapted to engage the second caster mount, the second bushing comprising a second top portion member and a second engagement portion;
f) a first caster uniquely configured to support the body at a first location on the body and that rotatably engages the first bushing;
g) a second caster uniquely configured to support the body at a second location on the body and that rotatably engages the second bushing;
h) said first and second locations on the body differing from one another;
i) a first wheel that rotatably engages the first caster; and
j) a second wheel that rotatably engages the second caster.

16. The ride-on toy of claim 15, wherein the first geometric shape of the first caster mount receptacle is a circle, a triangle, a square, a trapezoid, a rectangle, a star, a pentagon, a hexagon, a heptagon, an octagon, an n-gon, or an irregular shape; and
wherein the second geometric shape of the second caster mount receptacle is different than the first geometric shape of the first caster mount receptacle, and wherein the second geometric shape of the second caster mount receptacle is a circle, a triangle, a square, a trapezoid, a rectangle, a star, a pentagon, a hexagon, a heptagon, an octagon, an n-gon, or an irregular shape.

* * * * *